US007887611B2

(12) United States Patent
Asal et al.

(10) Patent No.: US 7,887,611 B2
(45) Date of Patent: Feb. 15, 2011

(54) EXTRACTION DEVICE HAVING A CENTRIFUGAL SEPARATOR

(75) Inventors: Wolfgang Asal, Aitern (DE); Jürgen Fischer, Wehr (DE)

(73) Assignee: Gardner Denver Schopfheim GmbH (DE)

( * ) Notice: Subject to any disclaimer, the term of this patent is extended or adjusted under 35 U.S.C. 154(b) by 386 days.

(21) Appl. No.: 11/916,802

(22) PCT Filed: Jun. 27, 2006

(86) PCT No.: PCT/EP2006/006164

§ 371 (c)(1),
(2), (4) Date: Jun. 17, 2008

(87) PCT Pub. No.: WO2007/000305

PCT Pub. Date: Jan. 4, 2007

(65) Prior Publication Data

US 2009/0223875 A1 Sep. 10, 2009

(30) Foreign Application Priority Data

Jun. 27, 2005 (DE) .................. 20 2005 010 076 U

(51) Int. Cl.
*B01D 45/12* (2006.01)
*B01D 50/00* (2006.01)

(52) U.S. Cl. ............................ 55/337; 55/429; 55/433; 55/459.1

(58) Field of Classification Search .................. 55/337, 55/429, 432, 433, 437, 438, 459.1; 209/133
See application file for complete search history.

(56) References Cited

U.S. PATENT DOCUMENTS

| | | | | |
|---|---|---|---|---|
| 1,170,438 | A | 2/1916 | Fahrney | |
| 2,397,980 | A * | 4/1946 | Petrl | 55/426 |
| 4,137,751 | A | 2/1979 | Rhodes et al. | 73/28 |

FOREIGN PATENT DOCUMENTS

| | | |
|---|---|---|
| DE | 177762 | 3/1954 |
| DE | 1 293 545 | 4/1969 |
| DE | 26 09 135 | 9/1977 |
| DE | 0 087 778 | 9/1983 |
| DE | 100 65 109 | 7/2001 |

(Continued)

OTHER PUBLICATIONS

German Search Report for parent case with partial translation for application No. 20 2005 010 076.5 dated Apr. 25, 2006 (4 pages).

(Continued)

*Primary Examiner*—Robert A Hopkins
(74) *Attorney, Agent, or Firm*—James B. Conte; Husch Blackwell LLP

(57) ABSTRACT

In an extraction device comprising a suction apparatus (16) with an electric motor (32) and an centrifugal separator (14) exhibiting an inlet cylinder (22), a vertically arranged dip pipe (30) and a lateral suction nozzle (24) through which a laden gas stream enters the inlet cylinder (22), it is provided with a view to creating a low-cost and easy-to-handle extraction device of a compact design, having a centrifugal separator, that the electric motor (32) is arranged inside the dip pipe (30).

15 Claims, 4 Drawing Sheets

FOREIGN PATENT DOCUMENTS

Figure 4:
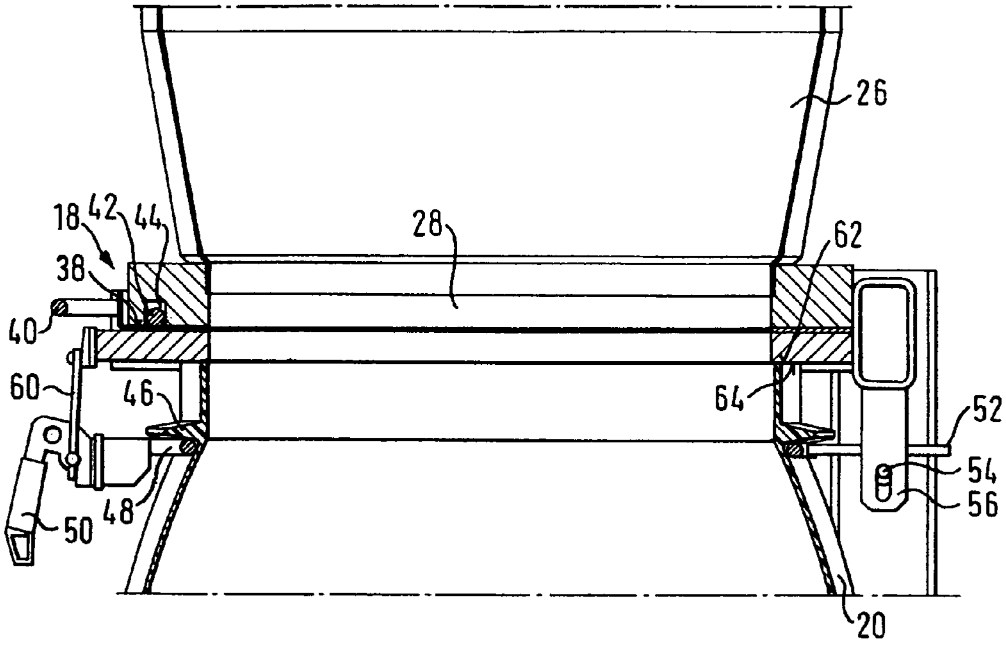

| | | | |
|---|---|---|---|
| EP | 0 087 778 | | 9/1983 |
| EP | 1 498 172 | A1 | 1/2005 |
| FR | 2 247 290 | | 5/1975 |
| JP | 57-042358 | | 3/1982 |
| WO | WO 2004/020107 | | 3/2004 |

OTHER PUBLICATIONS

Parent PCT International Search Report PCT/EP2006/006164 dated Aug. 29, 2006 (5 pages).

* cited by examiner

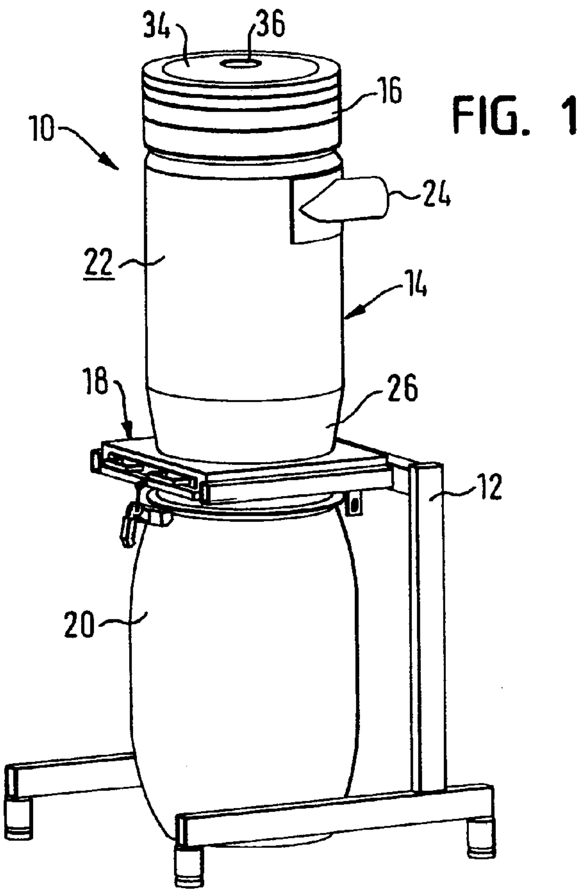
FIG. 1
FIG. 2
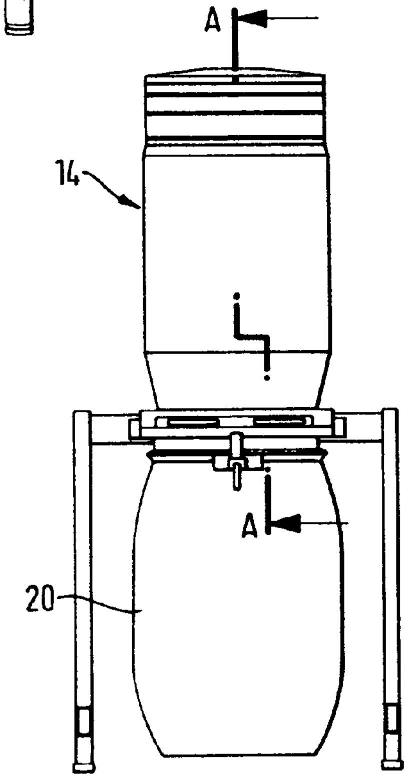
FIG. 3
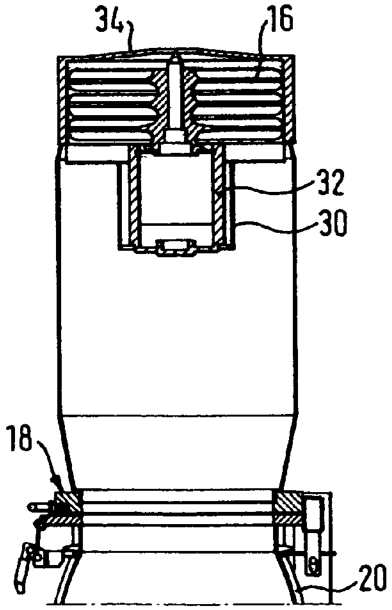

EXTRACTION DEVICE HAVING A CENTRIFUGAL SEPARATOR

The present invention relates to an extraction device comprising a suction apparatus with an electric motor and a centrifugal separator exhibiting an inlet cylinder, a vertically arranged dip pipe and a lateral suction nozzle through which a laden gas stream enters the inlet cylinder.

A centrifugal separator, also known as cyclone separator or simply as cyclone, is used to separate the solid (or also liquid) constituents of a laden gas stream form such gas stream. Extraction devices with centrifugal separators are used in many areas of application, e.g. for the collection of paper or foil waste in the packaging industry.

The object of the present invention is to create a low-cost and easy-to-handle extraction device of a compact design, having a centrifugal separator.

According to the present invention it is envisaged, for an extraction device of the aforementioned kind, to position the electric motor inside the dip pipe. The invention is based on the realisation that the dip pipe of the centrifugal separator can be sized such that the electric motor of the suction apparatus can be accommodated therein. So far, the electric motor has been an integral part of the suction apparatus which, on the whole, occupies a construction space that is determined to a large extent by the dimensions of the electric motor. Integration of the electric motor in the dip pipe results in a very space-saving set-up for the extraction device according to the present invention because the height of the device is reduced roughly by the length of the motor housing. The extraction device according to the present invention also has the advantage that the gas flowing through the dip pipe cools the electric motor arranged therein. Separate cooling as for example by means of a fan impeller and a fan hood, which has so far been a standard, can thus be dispensed with.

The electric motor is preferable arranged inside the dip pipe such that a flow channel is formed between the electric motor and the inside wall of the dip pipe. The gas drawn in thus forced to flow closely past the electric motor, thereby ensuring very efficient cooling of the motor.

It is generally desired to have an extraction device operate permanently so as to enable a continuous overall process. Therefore, the invention envisages a catchment tank, which is arranged below a passage opening of the centrifugal separator, and a shut-off device for optional closing of the passage opening. During normal operation, the material drawn in falls through the passage opening into the catchment tank. By having the possibility to close the passage opening, the material drawn in can also be collected for a certain period of time in the top inlet cylinder before a new catchment tank is available. This allows the tanks to be changed during the operation of the extraction device, i.e. the device according to the present invention does not have to be stopped while the tanks are exchanged.

For separating the centrifugal separator from the catchment tank it is appropriate to have a shut-off device exhibiting a gate that can be inserted into a slot opening to close the passage opening.

Considering the fact that during operation of the extraction device, sealing of the slot opening should be ensured at all times, use of the gate can be arranged to be very easy and comfortable by way of a shut-off device exhibiting a shut-off element for sealing the slot opening, said shut-off element being automatically transferred into a passage position by the insertion of the gate.

In a preferred embodiment of the invention, the shut-off element is a shaft lying loosely in a recess, said shaft being free to move only in the direction of rotation around its longitudinal axis and in a vertical direction.

According to a special embodiment of the present invention, the extraction device also comprises a locking mechanism for attaching the catchment tank below the inlet cylinder, the locking mechanism exhibiting a centring device. This way, the installation of a new catchment tank is facilitated considerably.

The centring device can, for example, be realised such that the catchment tank exhibits a centring aid that is insertable between two blades, with a roller, on which the centring aid can glide, being rotatably arranged between said two blades. In this way, apart from "left-right" positioning, a specific height of the catchment tank is also predefined.

In order to vary the specified height or adapt it to certain tank types, it is advantageous that the position of the roller, especially its vertical height, is adjustable.

A fully correct positioning of the catchment tank below the centrifugal separator or, more precisely, below the passage opening, can be ensured in an easy way by the centring aid being insertable between the blades up to a defined stop.

The shut-off device is advantageously suited also as an interface or connecting link enabling a (detachable) connection of the catchment tank to the centrifugal separator. To this end, it is envisaged according to the present invention that with the centring aid fully inserted and the locking mechanism actuated, a rim of the catchment tank is positioned directly opposite to a sealing surface of the shut-off device. As a result of the vacuum pressure prevailing during the operation of the extraction device, the tank rim automatically positions itself firmly against the sealing surface of the shut-off device.

Particularly suited as a suction apparatus is a multi-stage radial blower because it allow large volume flows and because only relatively low pressure differentials are required for most applications.

Figure 5:
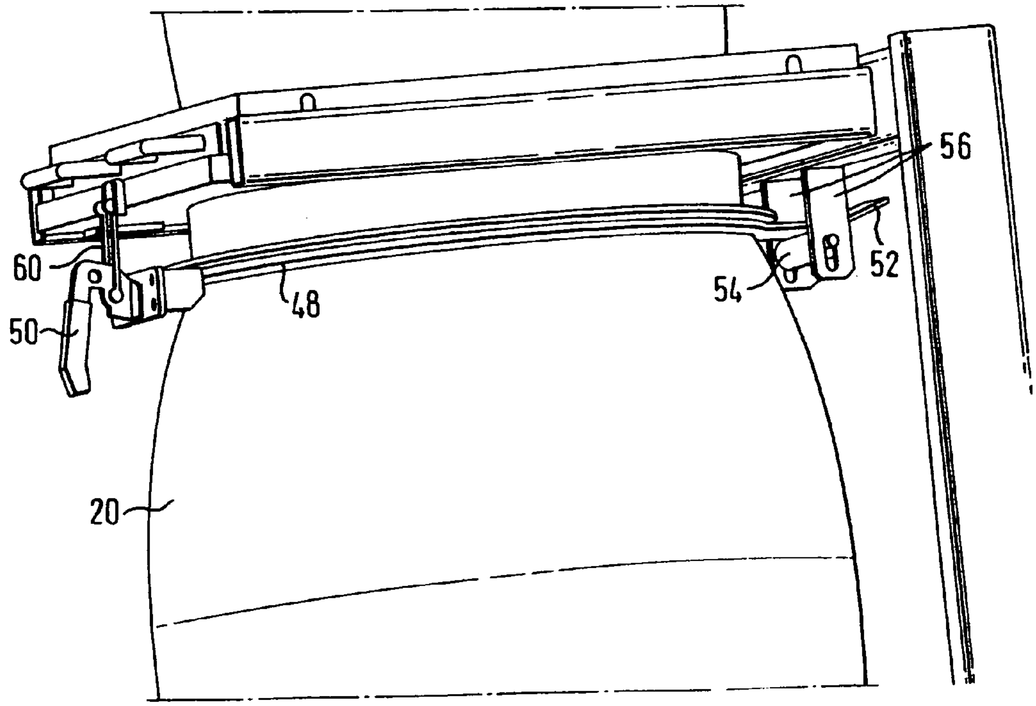
Figure 6:
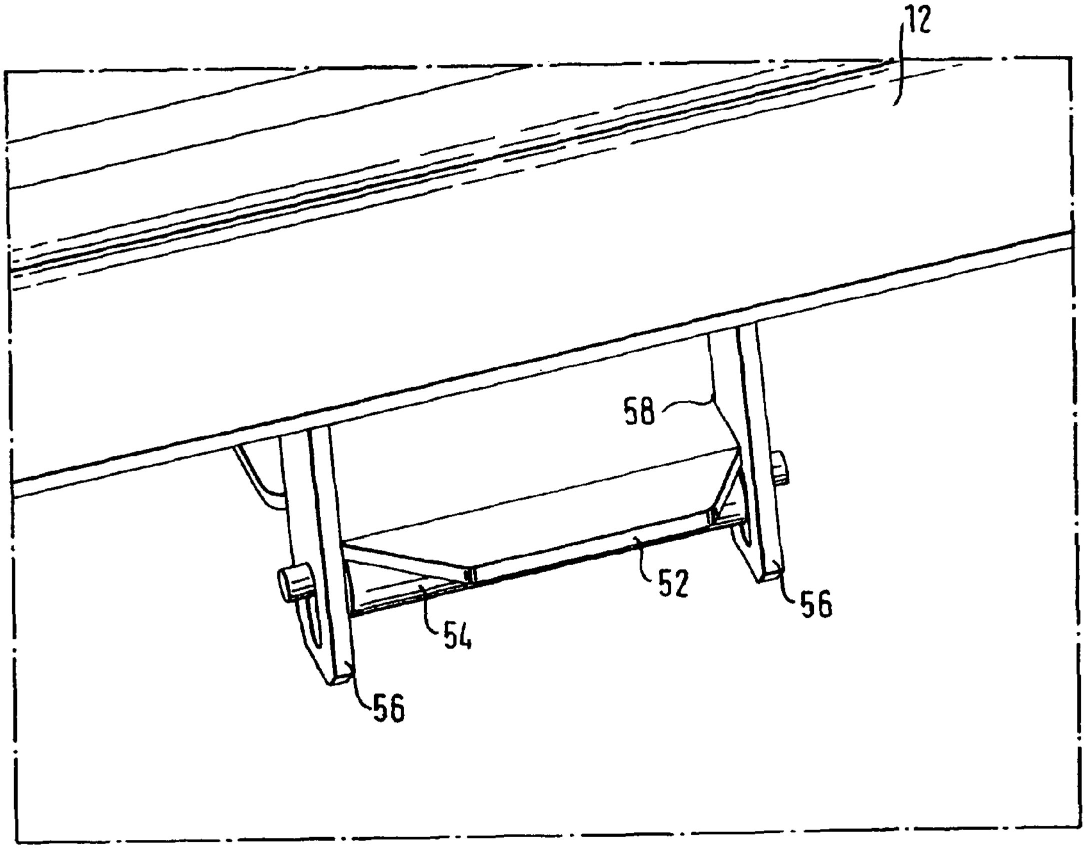

Further features and advantages of the invention result from the following description of preferred embodiments with reference to the drawings attached, which show in:

FIG. 1 a perspective view of an extraction device according to the present invention;

FIG. 2 a side view of the extraction device;

FIG. 3 a side view along line A-A in FIG. 2;

FIG. 4 an enlarged representation of the middle part of the extraction device as a partial sectional view;

FIG. 5 a perspective view of the middle part of the extraction device;

FIG. 6 a perspective detail view of the centring device; and

Figure 7:
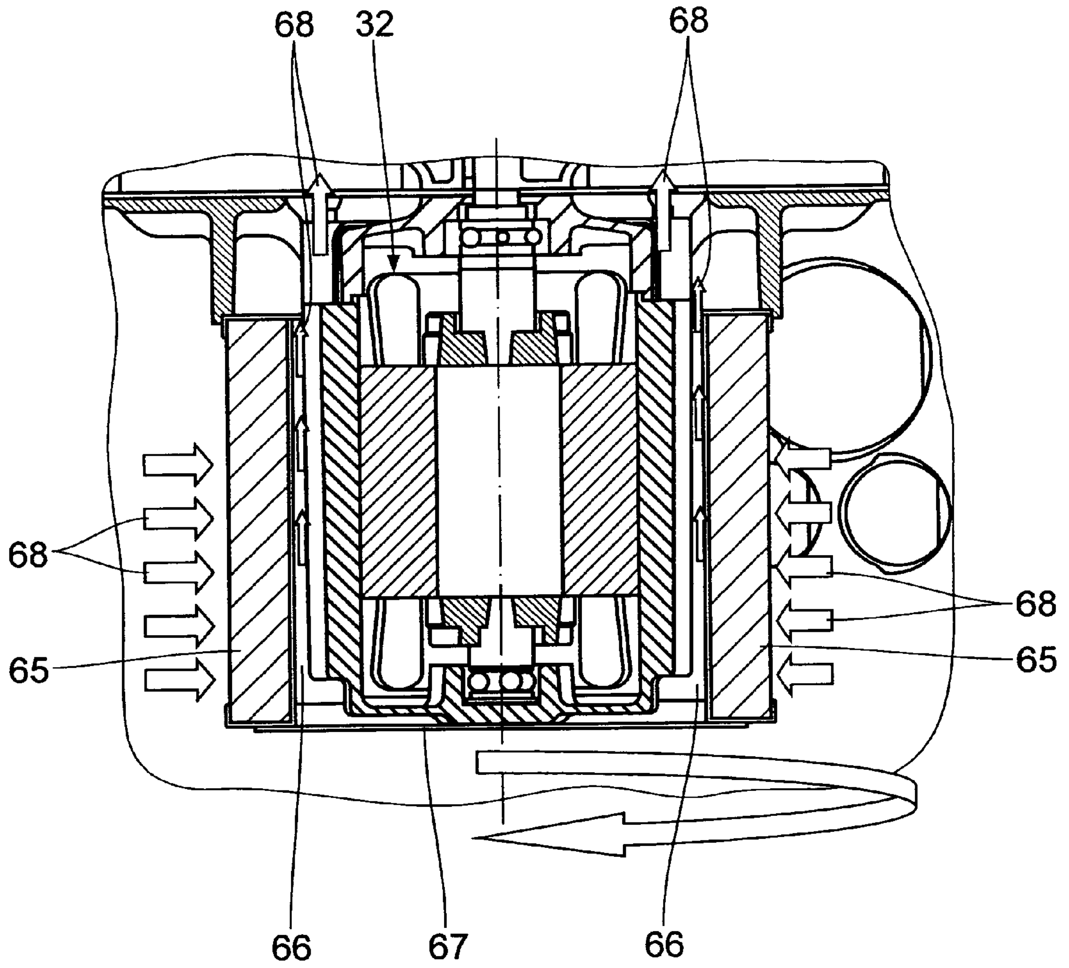

FIG. 7 a side view enlargement corresponding to FIG. 3 of a second embodiment.

The extraction device 10 shown in FIGS. 1 and 2 essentially consists of a base frame 12, a centrifugal separator 14 (cyclone), a multi-stage radial blower 16, a gate box 18 and an exchangeable catchment tank 20 made of plastic, which can optionally be fitted with rollers.

The centrifugal separator 14 exhibits an inlet cylinder 22 with a lateral suction nozzle 24 through which a gas stream laden with solid (or also liquid) constituents enters the inside of the inlet cylinder 22. A bottom, narrowing cone-shaped section 26 of the inlet cylinder 22 exhibits a passage opening 28 having a circular cross-sectional area of a maximum size, said cross-sectional area being adapted to the opening cross-section of the catchment tank 20 (see FIG. 4).

A suction connection of the radial blower 16 is connected to a dip pipe 30, which is centrally arranged in the centrifugal separator 14 (see FIG. 3). Inside the dip pipe 30, there is arranged an electric motor 32 of the radial blower 16. The electric motor 32 is positioned such that between the housing of the electric motor 32 and the inside wall of the dip pipe 30 there is formed a flow channel. In a cover 34 of the radial blower 16 there is formed an exit opening 36.

The cone-shaped section 26 of the inlet cylinder 22 is connected to the gate box 18 that has several functions, as will be explained below. The gate box 18 shown in detail in FIG. 4 has a slot opening 38 through which a gate 40 may be slid in. The gate 40 can be inserted so far that the passage opening 28 of the centrifugal separator 14 is fully closed, i.e. the gate box 18 primarily serves as a shut-off device.

To seal of the slot opening 38, there is envisaged a smooth shaft 42, which is loosely placed in a recess 44 of the gate box 18. The recess 44 is sized such that the shaft 42 can only turn around its longitudinal axis and be moved vertically.

In order to detachably mount and seal off the catchment tank 20, there is envisaged a special locking mechanism as can be seen from FIGS. 4 and 5. The catchment tank 20 is equipped with a fastening hoop 48 arranged circumferentially below a collar 46, it being possible to adapt said hoop to various tank shapes. On one side, the fastening hoop 48 exhibits a closing handle 50, and on the opposite side a centring aid 52. The centring aid 52 consists of a tapered plate that may also be bent upwards (see FIG. 6). On the base frame 12 there is provided a support for a plastic roller 54, said support being designed especially as required for the centring aid 52. Said support consists of two blades 56, between which the roller 54 is arranged such that it can rotate and be adjusted vertically. The centring aid 52 and the support with the roller 54 together form the centring device for the catchment tank 20.

In the following the functioning of the extraction device 10 will be explained. Prior to the start of the extraction device 10, an empty catchment tank 20 is attached to the gate box 18. To this end the catchment tank 20 is pushed, at an ergonomic handling height, underneath the gate box 18. During this pushing movement, the centring aid 52, because of its tapered tongue, easily finds its way in between the blades 56. The centring aid 52 glides on the plastic roller 54 until the centring aid 52 is firmly positioned against the blades 56 (see reference number 58 in FIG. 6). In this position the catchment tank 20 is arranged centrally below the passage opening 28 of the centrifugal separator 14.

The catchment tank 20 is then lifted and locked in position by hooking the closing handle 50 into a support 60 attached to the base frame 12 or the gate box 18, so that the top rim 62 of the catchment tank 20 directly faces a sealing surface 64 of the gate box 18. In the case of a centring aid 52 bent upwards, at least the rear part of the catchment tank 20 is already lifted automatically when the centring aid 52 is pushed in between the blades 56.

Further sealing between the tank rim 62 and the sealing surface 64 is not necessarily required because, owing to the vacuum pressure prevailing during operation, the fully circumferential, plane tank rim 62 automatically positions itself against the plane sealing surface 64 of the gate box 18. Small leaks between the tank rim 62 and the sealing surface 64 do not interfere with the suction operation of the device 10, and are even desired. This is because, in that case, no additional venting control system is required for the catchment tank 20 when it comes to removing the catchment tank 20.

During operation of the extraction device 10 the radial blower 16 draws in the laden gas stream (e.g. air with foil or paper waste) through the suction nozzle 24 into the inlet cylinder 22. Owing to the tangential arrangement of the suction nozzle 24, a swirling flow is created inside the inlet cylinder 22. Owing to the centrifugal forces, the solid (and/or liquid) constituents in the air stream (drawn-in material) are radially accelerated towards the outside. This effect is intensified by the tapering of the cone-shaped section 26 because there the rotational speed increases. The drawn-in material is pressed against the inside wall of the inlet cylinder 22, sliding downwards in spiralling paths towards the bottom through the passage opening 28 into the catchment tank 20. With the circular cross-sectional area of the passage opening 28 having a maximum size, the risk of blockage during the passage of the drawn-in material is minimised.

The air that has been rid of the drawn-in material is blown out by the radial blower 16 through the exit opening 36, with the air stream, which passes through the flow channel alongside the electric motor 32, sufficiently cooling the electric motor 32.

To change the catchment tank 20 during operation of the extraction device 10, the gate 40 is inserted into the slot opening 38 of the gate box 18. While being inserted, the gate 40 impinges on the shaft 42 below its longitudinal axis, so that, because of the wedge effect, the shaft 42 is pushed vertically upwards. In this passage position the shaft 42 rolls on the gate 40 thus ensuring continued sealing of the slot opening 38. The fully inserted gate 40 seals off the entire passage opening 28.

If there are solid constituents (e.g. long strips of paper or foil) in the transitional area between the centrifugal separator 14 and the catchment tank 20, they are severed, or at least wedged in, when the gate 40 is inserted, so that they do not interfere with the continued operation of the extraction device 10. The constituents may also be removed manually. The catchment tank 20 may then be removed from its support by opening the handle 50.

Once a new catchment tank 20 has been positioned and secured in place, the gate 40 is pulled back out. Owing to the force of gravitation, the shaft 42 drops back down into its original position, thus continually sealing off the slot opening 38. The drawn-in material collected in the bottom section 26 of the inlet cylinder 22 during the tank exchange then drops through the re-opened passage opening 28 into the new catchment tank 20.

The special design of the locking mechanism with the easily graspable handle 50 and the centring device allows an advantageous exchange of the tank in a one-handed operation.

As already mentioned, the extraction device 10 according to the present invention is particularly suited for foil and paper removal in the packaging industry, but it is by no means limited to this application.

FIG. 7 shows an enlargement of a detail of a view corresponding to FIG. 3 of a second embodiment. It shows the area around electric motor 32. In FIG. 3, electric motor 32 is surrounded by a dip pipe 30. In FIG. 7, electric motor 32 is surrounded by a filter cartridge 65, which has a ring cylindrical shape. Between the filter cartridge 65 and the electric motor 32 a ring cylindrical gap 66 is defined. On the lower end of the filter cartridge 65 a lid 67 is fixed thereto thus enclosing electric motor 32. The arrows 68 indicate the flow direction from the outside of filter cartridge 65 through filter cartridge 65 and subsequently through gap 66. Apart from that the functioning is similar to that of the first embodiment.

The invention claimed is:

1. An extraction device comprising:

a) a suction apparatus (16) with b) an electric motor (32) and c) a centrifugal separator (14) having an outflow exhibiting d) an inlet cylinder (22), e) a vertically arranged dip pipe (30) having a length and configured such that said outflow passes substantially through the length and f) a lateral suction nozzle (24) through which a laden gas stream enters the inlet cylinder (22), characterised in that g) the electric motor (32) is arranged inside the dip pipe (30).

2. An extraction device comprising:

a) a suction apparatus (16) with b) an electric motor (32) and c) a centrifugal separator (14) exhibiting d) an inlet cylinder (22), e) a vertically arranged dip pipe (30) and f) a lateral suction nozzle (24) through which a laden gas stream enters the inlet cylinder (22), characterised in that g) the electric motor (32) is arranged inside the dip pipe (30); wherein a flow channel is formed between the electric motor (32) and the internal wall of the dip pipe (30).

3. An extraction device comprising:

a) a suction apparatus (16) with b) an electric motor (32) and c) a centrifugal separator (14) exhibiting d) an inlet cylinder (22)

e) a vertically arranged dip pipe (30) and f) a lateral suction nozzle (24) through which a laden gas stream enters the inlet cylinder (22), characterised in that g) the electric motor (32) is arranged inside the dip pipe (30); wherein a catchment tank (20) is arranged beneath a passage opening (28) of the centrifugal separator (14), and a shut-off device (18) for the optional closing of the passage opening (28).

4. The extraction device according to claim 3, characterised in that the passage opening (28) exhibits a circular cross-sectional area of a maximum size, which is adapted to an opening cross-section of the catch-ment tank (20).

5. The extraction device according to claim 3, characterised in that the shut-off device (18) exhibits a gate (40) that is insertable into a slot opening (38).

6. The extraction device according to claim 5, characterised in that the shutoff device (18) exhibits a shut-off element (42) for sealing off the slot opening (38), said shut-off element (42) being automatically transferred into a passage position by the insertion of the gate (40).

7. The extraction device according to claim 6, characterised in that the shutoff element is a shaft (42) lying loosely in a recess (44), said shaft being free to move only in a direction of rotation around its longitudinal axis and in a vertical direction.

8. The extraction device according to claim 3 characterised by a locking mechanism for mounting the catchment tank (20) beneath the inlet cylinder (22), the locking mechanism exhibiting a centring device.

9. The extraction device according to claim 8, characterised in that the catchment tank (20) exhibits a centring aid (52) which is insertable between two blades (56), with a roller (54) on which the centring aid (52) can slide being rotatably arranged between said two blades (56).

10. The extraction device according to claim 9, characterised in that the position of the roller (54) is adjustable.

11. The extraction device according to claim 9, characterised that the centring aid (52) is insertable between the blades (56) up to a defined stop (58).

12. The extraction device according to claim 9 characterised in that, with the centring aid (52) being pushed fully in and the locking mechanism actuated, a rim (62) of the catchment tank (20) is positioned directly opposite a sealing surface (64) of the shut-off device (18).

13. The extraction device according to claim 8, characterised in that the locking mechanism and the centring aid are designed such that a one-handed exchange of the catchment tank (20) is possible.

14. The extraction device according to claim 13 characterised in that the suction apparatus is a multi-stage radial blower (16).

15. An extraction device comprising:

a) a suction apparatus (16) with b) an electric motor (32) and c) an centrifugal separator (14) exhibiting d) an inlet cylinder (22), e) a vertically arranged filter cartridge (65) and f) a lateral suction nozzle (24) through which a laden gas stream enters the inlet cylinder (22), characterised in that g) the electric motor (32) is arranged inside the filter cartridge (65).

* * * * *